US011625580B2

(12) United States Patent
Wortsman et al.

(10) Patent No.: US 11,625,580 B2
(45) Date of Patent: Apr. 11, 2023

(54) NEURAL NETWORK WIRING DISCOVERY

(71) Applicant: XNOR.ai, Inc., Seattle, WA (US)

(72) Inventors: Mitchell Noss Wortsman, Seattle, WA (US); Ali Farhadi, Seattle, WA (US); Mohammad Rastegari, Seattle, WA (US)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 16/888,611

(22) Filed: May 29, 2020

(65) Prior Publication Data

US 2020/0380342 A1 Dec. 3, 2020

Related U.S. Application Data

(60) Provisional application No. 62/855,642, filed on May 31, 2019.

(51) Int. Cl.
*G06N 3/08* (2006.01)
*G06N 3/06* (2006.01)
*G06N 3/04* (2023.01)
*G06N 3/084* (2023.01)
*G06K 9/62* (2022.01)

(52) U.S. Cl.
CPC ............. *G06N 3/06* (2013.01); *G06K 9/6256* (2013.01); *G06N 3/04* (2013.01); *G06N 3/084* (2013.01)

(58) Field of Classification Search
CPC ........ G06N 3/0454; G06N 3/084; G06N 3/04; G06N 3/08; G06N 3/082; G06N 3/0445; G06N 3/06; G06N 3/063; G06N 3/0481; G06N 20/10; G06N 3/088; G06N 5/046; G06N 3/006; G06F 17/16; G06F 2207/4824; G06F 5/01; G06F 17/11; G06F 2111/10; G06F 30/20; G06F 9/5027; G06V 10/454; G06V 10/82; G06V 10/443; G06V 2201/03; G06V 40/10; G06K 9/6256; G06K 9/6284; G06K 9/6228; G06T 2207/20084; G06T 7/0012; G06T 15/04; G06T 15/20; G06T 15/506

See application file for complete search history.

(56) References Cited

U.S. PATENT DOCUMENTS

| | | | |
|---|---|---|---|
| 9,767,410 B1* | 9/2017 | Guevara | G10L 15/16 |
| 2019/0050727 A1* | 2/2019 | Anderson | G06N 3/08 |
| 2020/0218982 A1* | 7/2020 | Annau | G06N 20/00 |
| 2020/0302273 A1* | 9/2020 | Chung | G06V 10/82 |

* cited by examiner

*Primary Examiner* — Quan M Hua
(74) *Attorney, Agent, or Firm* — BakerHostetler

(57) ABSTRACT

Neural wirings may be discovered concurrently with training a neural network. Respective weights may be assigned to each edge connecting nodes of a neural graph, wherein the neural graph represents a neural network. A subset of edges may be designated based on the respective weights and data is passed through the neural graph in a forward training pass using the designated subset of edges. A loss function may be determined based on the results of the forward training pass and parameters of the neural network and the respective weights assigned to each edge may be updated in a backwards training pass based on the loss function. The steps of designating the subset of edges, passing data through the neural graph, determining the loss function, and updating parameters of the neural network and the respective weights may be repeated to train the neural network.

20 Claims, 7 Drawing Sheets

NEURAL NETWORK WIRING DISCOVERY

CROSS-REFERENCE TO RELATED APPLICATIONS

This application claims the benefit of U.S. Provisional Application No. 62/855,642, titled "DISCOVERING NEURAL WIRINGS" and filed on May 31, 2019, which is hereby incorporated by reference herein for all purposes.

TECHNICAL FIELD

The present description generally relates to neural networks and more particularly to design of the architecture of neural networks.

BACKGROUND

Neural networks are being trained for increasingly complex tasks. Neural network architecture is often hand designed using manually defined sets of building blocks. Efforts to automate the design of neural networks have included using reinforcement learning and gradient based approaches to search among sets of building blocks and possible interconnections between the building blocks. However, the possible connectivity within these neural networks is constrained using these techniques.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
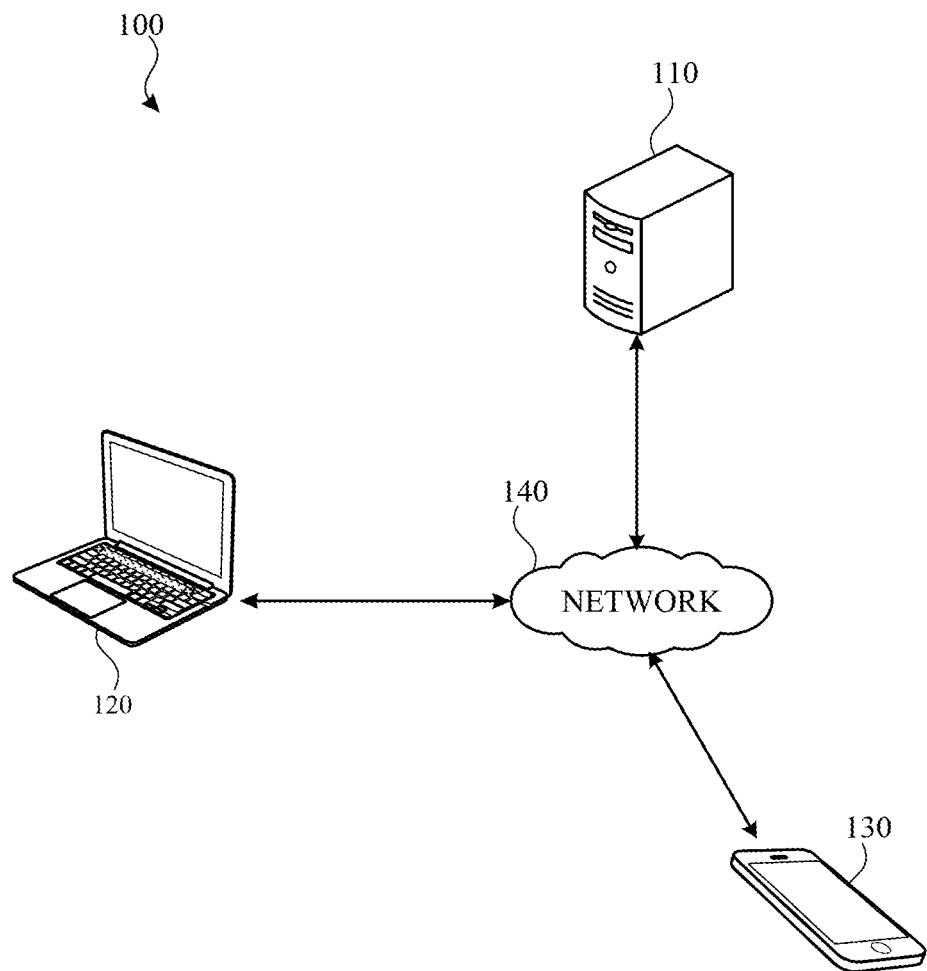
FIG. 1 illustrates an example network environment according to aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology augments training of a neural network to learn connectivity between the nodes of the neural network concurrently with learning the parameters of the neural network. In the augmented training, a neural network may be treated as a neural graph where each node of the neural graph may process a single channel. The layer structure of a neural network is relaxed to enable channels to form connections between nodes independent of other channels. In this manner, the augmented training may consider an unconstrained space of all possible neural wiring represented by edges in the neural graph to discover the subset of the neural wiring used in the trained neural network.

While all possible edges between nodes in the neural graph may be considered, the augmented training may utilize a constraint on the total number of edges used in the neural graph at the completion of training. At the beginning of training, weights may be randomly assigned to the edges in the neural graph and each of the edges may be designated to be part of a first subset of edges referred to as real edges or a second subset of edges called hallucinated edges based on the magnitudes of the respective weights. During a forward pass of each training iteration, data is passed through the neural graph using only the real edges. During a backward pass of each training iteration, however, the training is augmented to update the weights of both the real edges and the hallucinated edges, as discussed in more detail below. At the beginning of a next training iteration, the edges may be re-designated as either a real edge or a hallucinated edge based on the magnitudes of the updated respective weights. Accordingly, some edges designated as real edges at the beginning of training may be swapped out with some originally designated hallucinated edges once training is complete with the total number of real edges being subject to the constraint on the total number of edges used once training is complete.

According to aspects of the subject technology, a respective weight is assigned to each edge of a plurality of edges connecting nodes of a neural graph, wherein the neural graph represents a neural network. A subset of edges from the plurality of edges may be designated based on the respective weights and data is passed through the neural graph in a forward training pass using the designated subset of edges. A loss function may be determined based on the results of the forward training pass and parameters of the neural network and the respective weights assigned to each edge of the plurality of edges may be updated in a backwards training pass based on the loss function. The steps of designating the subset of edges, passing data through the neural graph, determining the loss function, and updating parameters of the neural network and the respective weights may be repeated for a plurality of iterations to train the neural network. The trained neural network may be stored for deployment on a computing device.

The subset of edges may be designated by determining an absolute value of each of the respective weights, sorting the plurality of edges based on the absolute values of the respective weights, and designating a predetermined number of the edges in the plurality of edges having absolute respective weight values greater than the absolute respective weight values of the remaining edges of the plurality of edges as the subset of edges. A subset of edges designated during a first iteration may be different than a subset of edges designated during a second iteration.

Updating parameters of the neural network and the respective weights of the plurality of edges may include determining a gradient with respect to the plurality of edges for minimizing the loss function, passing the gradient through the first subset of edges in the backwards training pass, and passing the gradient to but not through remaining edges of the plurality of edges in the backwards training pass. The plurality of edges includes edges connecting each node in the neural graph to every other node in the neural graph.

The neural network may be a convolutional neural network with each node configured to perform a convolution on input data to generate output data. Input data having a first size may be passed through a node to generate output data having a second size smaller than the first size. The generated output data may be padded so that the generated output data has the first size. The neural graph may be a static graph having no looping paths. The neural graph may be a dynamic graph comprising at least one looping path.

Discovering neural wirings of a neural network using the augmented training of the subject technology produces trained neural networks that have higher accuracy in trained tasks using the same or similar numbers of floating point operations (FLOPs) compared with neural networks trained using other techniques. The improved accuracy using the same or similar numbers of FLOPs may allow neural networks trained using the subject technology to be more efficient than neural networks trained using other techniques to achieve the same accuracy. For example, the neural networks trained using the subject technology may be smaller in size and thereby require less storage space. In addition, the neural networks may use fewer FLOPs and thereby have lower latency and/or require few hardware resources to execute trained tasks.

FIG. 1 illustrates an example network environment 100 according to aspects of the subject technology. Not all of the depicted components may be used in all implementations, however, and one or more implementations may include additional or different components than those shown in the figure. Variations in the arrangement and type of the components may be made without departing from the scope of the claims as set forth herein. Additional components, different components, or fewer components may be provided.

The network environment 100 includes server 110, computing device 120, and computing device 130. Network 140 may communicatively (directly or indirectly) couple server 110 and computing devices 120 and 130. Network 140 is not limited to any particular type of network, network topology, or network media. Network 140 may be a local area network or a wide area network. Network 140 may be an interconnected network of devices that may include, or may be communicatively coupled to, the Internet. For explanatory purposes, the network environment 100 is illustrated in FIG. 1 as including the server 110 and the computing devices 120 and 130. However, the network environment 100 may include any number of electronic devices and any number of servers. Computing device 120 is depicted as a laptop computer and computing device 130 is depicted as a smartphone. The subject technology is not limited to these embodiments of computing devices. Server 110 and computing devices 120 and 130 may include all or part of the components of the system described below with respect to FIG. 7.

Server 110 may provide a system for discovering neural wirings during training of neural networks according to the techniques described herein. Server 110 may deploy the trained neural networks to computing devices 120 or 130 for application of the trained neural network on trained tasks. The deployment may be via network 140 or through other transfer mechanisms. The discovery of neural wirings during training of neural networks is not limited to being performed on server 110 and also may be performed by computing devices 120 and/or 130.

Figure 2:
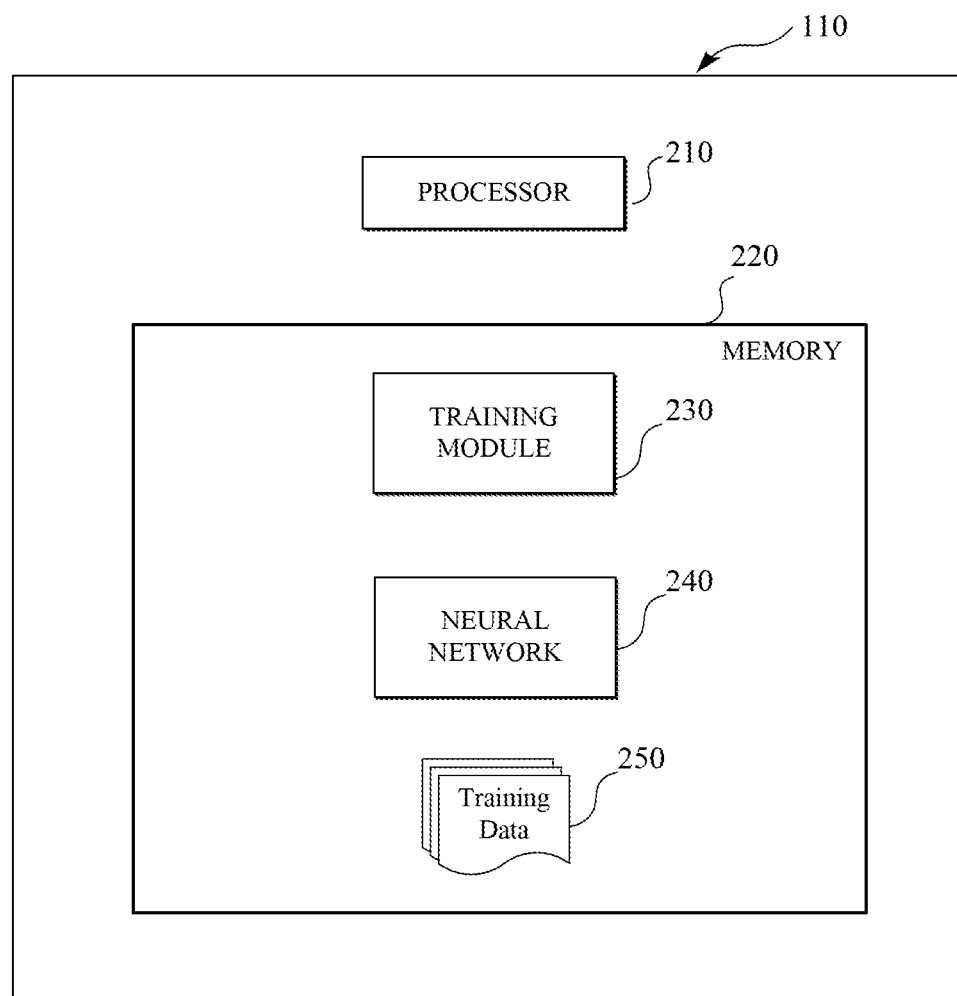
FIG. 2 illustrates an example computing architecture for a system providing discovery of neural wirings in a neural network while training the neural network according to aspects of the subject technology.

FIG. 2 is a block diagram illustrating components of server 110 used in discovering neural wirings while training neural networks according to aspects of the subject technology. While the components are being described as being part of server 110, some or all of the components may be implemented on other systems such as computing devices 120 and 130. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, server 110 includes processor 210 and memory 220. Examples of processor 210 and memory 220 are provided below in connection with FIG. 7. Memory 220 may contain training module 230, neural network 240, and training data 250. Training module 230 represents code comprising one or more sequences of instructions executable by processor 210 to implement the neural network training processes described herein. Neural network model 240 represents neural networks that may be trained by training module 230. The subject technology is not limited to any particular types of neural networks. Training data 250 represent labeled data sets are curated for different types of tasks for which neural network 240 may be trained. For example, the training data may include images, text, audio, or video files.

Figure 3:
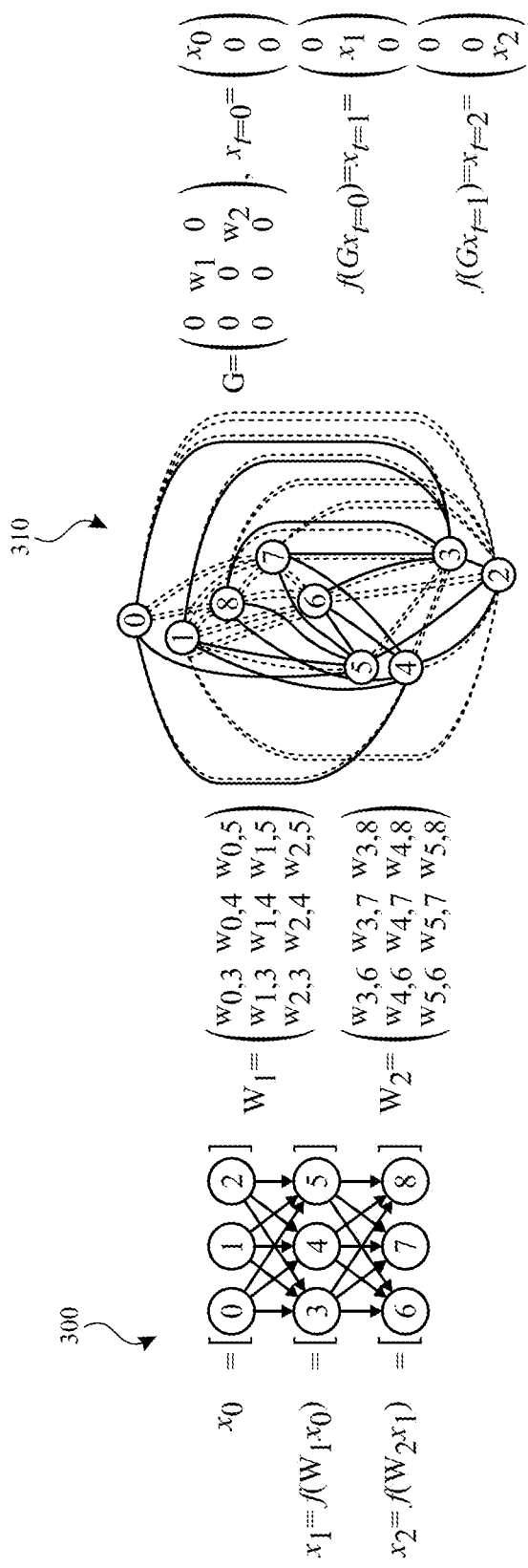
FIG. 3 is a depiction of a neural network and a neural graph representation of the neural network as a neural graph according to aspects of the subject technology.

As noted above, the subject technology uses a neural graph representation of a neural network for the training processes described herein. FIG. 3 depicts a neural network 300 and a representation of neural network 300 as neural graph 310. In the examples depicted in FIG. 3, neural network 300 is a three-layer perceptron that is represented by a dynamic neural graph 310 with three time steps. Dynamic neural graph 310 depicts all possible edges connecting the nodes together. In the depicted example, the real edges are depicted with solid lines and the hallucinated edges are depicted with dashed lines.

The subject technology may be applied to both dynamic neural graphs, such as that depicted in FIG. 3, and static neural graphs. With respect to static neural graphs, each node typically has a single output and the graphical structure is acyclic. With respect to dynamic neural graphs, the state of a node may vary with time and the graph may contain cycles used to express sequential models and feed-forward networks. Turning to static neural graphs, a static neural graph may be represented as directed acyclic graph $\mathcal{G} = (V, E)$ made up of nodes V and edges $E \subseteq V \times V$. The state of a node $v \in V$ may be given by variable $Z_v$. At each node v, a function $f_{\theta_v}$ having parameters $\theta_v$ may be applied and each edge (u,v) may be associated with a respective weight $w_{uv}$. In a multi-layer perceptron, the function may be a parameter-free non-linear activation such as a rectified linear unit (ReLU).

For any set $\mathcal{A} \subseteq V$, $Z_\mathcal{A}$ may be used to denote $(Z_v)_{v \in \mathcal{A}}$, where $Z_V$ is a vector containing the states of all the nodes in the neural graph. Nodes V include a subset of input nodes $V_0$ with no parents in the graph and a subset of output nodes $V_E$ with no children in the graph. Input data $X \sim p_x$ flows into the network through $V_0$ as $Z_{V_0} = g_\phi(X)$ for a function g which may have parameters $\phi$. Accordingly, the state of the nodes in the neural graph may be given by Equation (1) below:

$$Z_v = \begin{cases} f_{\theta_v}\left(\sum_{(u,v) \in \varepsilon} w_{uv} Z_u\right), & v \in V \setminus V_0 \\ g_\phi^{(v)}(X), & v \in V_0 \end{cases} \quad (1)$$

The output of the neural graph $\hat{y}$ is given by $h_\psi(Z_{V_E})$, where h is a function which may have parameters $\psi$. The input to a node v may be expressed as $\mathcal{J}_v = \Sigma_{(u,v) \in E} w_{uv} Z_u$.

According to aspects of the subject technology, the input and output to each node may be a two-dimensional matrix and be referred to as a channel. The node may perform a non-linear activation followed by normalization and convolution. The convolution may be strided to reduce spatial resolution. The combination of a separate 3×3 convolution (depthwise convolution) for each channel followed by a 1×1 convolution (pointwise convolution) may be referred to as a depthwise separable convolution.

Figure 4:
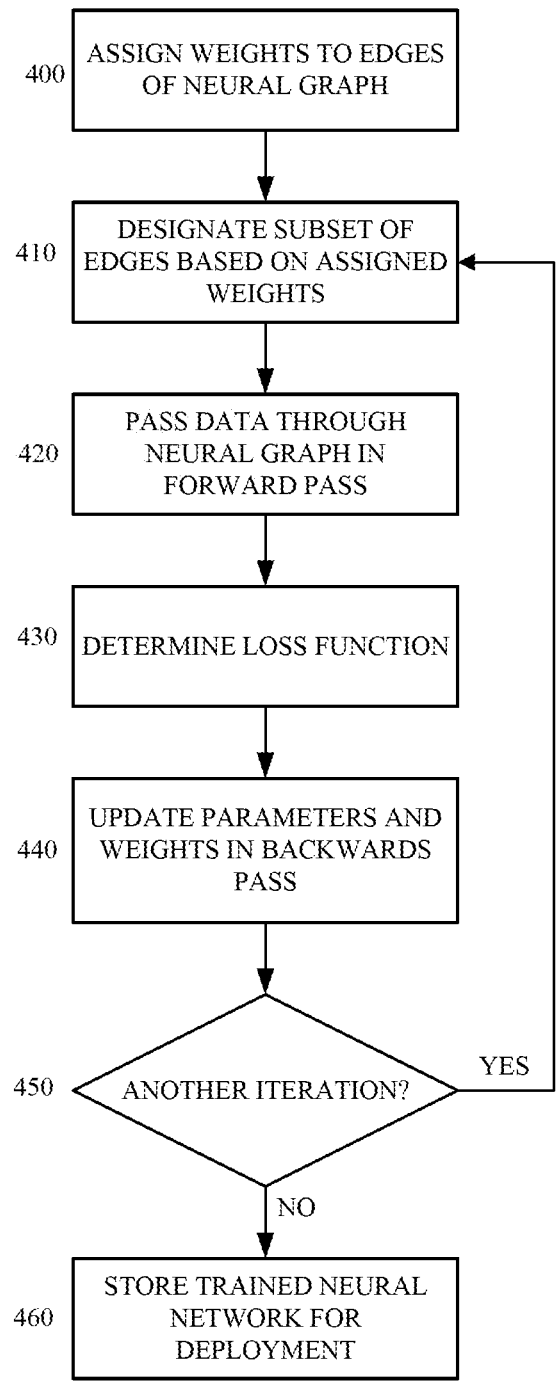
FIG. 4 is a flowchart illustrating a process for discovering edges of a neural graph while training parameters of a neural network represented by the neural graph according to aspects of the subject technology.

According to aspects of the subject technology, training module 230 may be configured to discover neural wirings represented by the edges of a neural graph while training parameters of the neural network represented by the neural graph. FIG. 4 is a flowchart illustrating a process for discovering edges of a neural graph while training parameters of a neural network represented by the neural graph according to aspects of the subject technology. For explanatory purposes, the blocks of the process are described herein as occurring in serial, or linearly. However, multiple blocks of the process may occur in parallel. In addition, the blocks of the process need not be performed in the order shown and/or one or more blocks of the process need not be performed and/or can be replaced by other operations. The process represented by the flowchart in FIG. 3 will be described together with the example of the Training and Wiring Discovery Algorithm presented below.

---

Training and Wiring Discovery Algorithm

1: for each pair of nodes (u,v) such that u < v do
2:   Initialize $w_{uv}$ by independently sampling from a uniform distribution
3: for each training iteration do
4:   Sample mini batch of data and labels $(\mathcal{X}, \mathcal{Y}) = \{(\mathcal{X}_i, \mathcal{Y}_i)\}$ using $p_{xy}$
5:   $\varepsilon \leftarrow \{(u, v): |w_{uv}| \geq \tau\}$ where $\tau$ is chosen so that $|\varepsilon| = k$
6:   $Z_v \leftarrow \begin{cases} f_{\theta_v}\left(\sum_{(u,v) \in \varepsilon} w_{uv} Z_u\right), v \in V \setminus V_0 \\ g_\phi^{(v)}(X), v \in V_0 \end{cases}$
7:   $\hat{y} = h_\psi(\{Z_v\}_{v \in V_E})$
8:   Update $\phi, \{\theta_v\}_{v \in V}, \psi$ via SGD and Backprop using loss $\mathcal{L}(\hat{y}, \mathcal{y})$
9:   for each pair of nodes (u,v) such that u < v do
10:    $w_{uv} \leftarrow w_{uv} + \left\langle Z_u, -\alpha \frac{\partial \mathcal{L}}{\partial \mathcal{J}_v} \right\rangle$

---

As indicated above, a neural network may be represented by a neural graph comprising V nodes connected by edges. To prepare the neural graph for training, the edges connecting each pair of nodes (u,v) in the graph are assigned respective weights $w_{uv}$ (block 400). The respective weights may be independently sampled from a uniform distribution of weight values.

According to aspects of the subject technology, the set of edges may include edges connecting each node in the neural graph to every other node in the neural graph. A subset of the edges may be designated as a set of real edges E based on the assigned respective weights (block 410). The remaining undesignated edges (u,v)∉E are a set of hallucinated edges $E_{hal} = V \times V \setminus E$. The number of real edges E may be constrained to not exceed k, where k is a input parameter provided to the algorithm. In this example, the k edges having the largest magnitudes of weights may be designated as the real edges E.

Figure 5A:
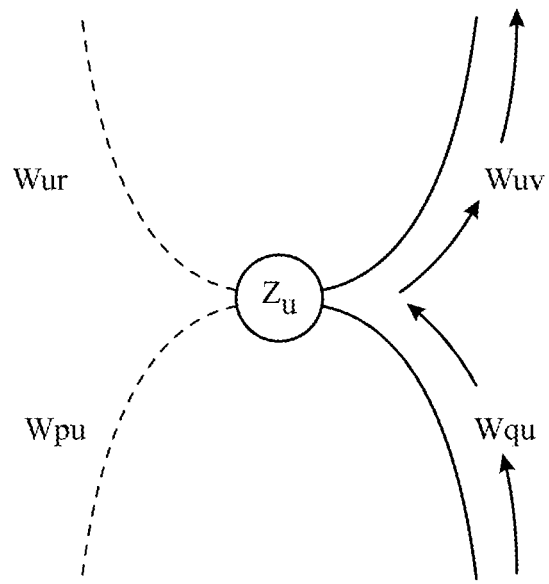
FIGS. 5A and 5B are graphical representations of a forward pass and a backward pass during a training iteration according to aspects of the subject technology.

Using the designated real edges E, a training data is passed through the neural graph using the real edges E but not the hallucinated edges $E_{hal}$ in a forward pass of a training iteration (block 420). The training data may be sampled from a set of data and labels $(X, y)$ having a uniform distribution. FIG. 5A is a graphical representation of a forward pass according to aspects of the subject technology. As depicted with the arrows in FIG. 5A, data is passed through node $Z_u$ via real edges having assigned weights $w_{qu}$ and $w_{uv}$, where $Z_u = f_{\theta_u}(\Sigma_{(u,v) \in E} Z_q)$. The edges having the assigned weights $w_{pu}$ and $w_{ur}$ are part of the hallucinated edges $E_{hal}$ and therefore are not used in the forward pass of the training iteration.

Figure 5B:
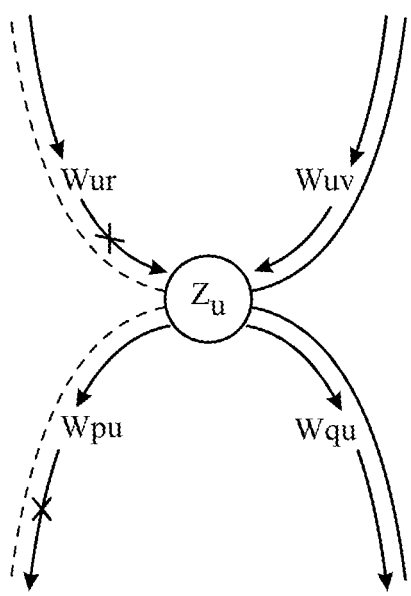

After the forward pass of the training iteration is completed, the output $\hat{y}$ of the neural graph is used to determine a loss function $\mathcal{L}(\hat{y}, \mathcal{y})$ (block 430). A gradient is determined based on the loss function $\mathcal{L}$ and the network parameters $\phi$, $\{\theta_v\}_{v \in V}$, and $\psi$ and the respective weights assigned to the edges are updated in a backwards pass of the training iteration based on the gradient (block 440). The update process may use stochastic gradient descent (SGD) and backpropagation according to aspects of the subject technology. FIG. 5B is a graphical representation of a backwards pass according to aspects of the subject technology. The network parameters $\phi$, $\{\theta_v\}_{v \in V}$, and $\psi$ may be updated by allowing the gradient to flow to each node via the real edges E. Referring to FIG. 5B, the flow through the node $Z_u$ via real edges having assigned weights $w_{qu}$ and $w_{uv}$ is show with the arrows. Like the in the forward pass, the hallucinated edges $E_{hal}$ are not used to update the network parameters.

With respect to updating the respective weights assigned to the edges, both the real edges E and the hallucinated edges $E_{hal}$ are updated using the update rule $$\tilde{w}_{uv} = w_{uv} + \left\langle Z_u, -\alpha \frac{\partial \mathcal{L}}{\partial \mathcal{J}_v} \right\rangle.$$

However, as depicted in FIG. 5B, the updated weights for the hallucinated edges $E_{hal}$ are not passed through to the nodes in the backwards pass.

Once the training iteration including the forward pass and the backwards pass has complete, the system may determine whether another training iteration should be performed (block 450). The number of training iterations may be supplied as an input parameter to the training process. Alternatively, the training iterations may continue until the loss function stabilizes between training iterations or based on other performance factors. If not more training iterations are to be performed, the trained neural network may be stored for deployment on server 110 or to other computing devices, such as computing devices 120 and 130 shown in FIG. 1 (block 460). The stored network includes the set of real edges E and the updated weights assigned to those edges, but does not include the hallucinated edges and their assigned respective weights.

If another training iteration is to be performed, the process returns to the designating a subset of the edges as real edges E as described above (block 410). As the respective weights assigned to the edges are updated during each training iteration, the magnitude of a weight assigned to one of the hallucinated edges $E_{hal}$ may increase enough to pass the smallest magnitude of a weight assigned to one of the real edges E, resulting in the hallucinated edge replacing the real edge in the set of real edges. For example, if the gradient is pushing $\mathcal{J}_v$ in a direction that aligns with $Z_u$, the magnitude of the assigned weight may be increased in the update. Swapping the edges when this situation occurs may decrease the loss $\mathcal{L}$.

Figure 6A:
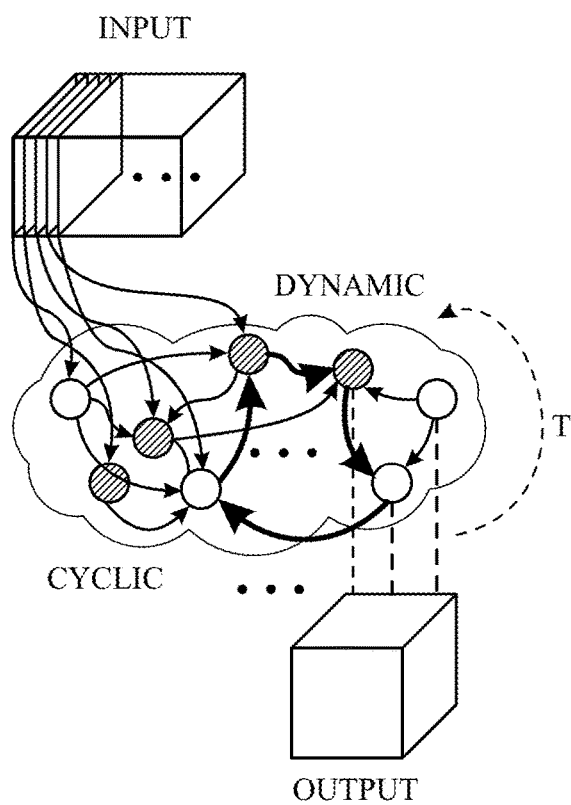
FIGS. 6A and 6B depict a dynamic neural graph and a static neural graph according to aspects of the subject technology.
Figure 6B:
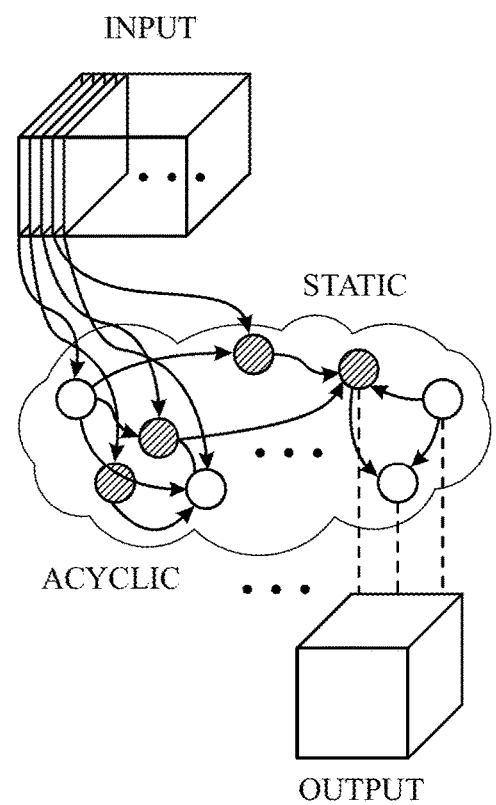

The example process described above was applied to a static neural graph. The subject technology is not limited to static neural graphs and may be used to discover neural wiring while training dynamic neural graphs. For example, FIG. 6A depicts a dynamic neural graph and FIG. 6B depicts a static neural graph according to aspects of the subject technology. As illustrated in FIGS. 6A and 6B, the static dynamic graph is acyclic and contains no looping paths while the dynamic neural graph is cyclic and contains at least one looping path.

In dynamic neural graphs, the state of each node $Z_v(t)$ may vary through time. The initial conditions of a dynamic neural graph may be represented by Equation (2) presented below.

$$Z_v(0) = \begin{cases} g_\phi^{(v)}(X), & v \in V_0 \\ 0, & v \in V \setminus V_0 \end{cases} \quad (2)$$

For a discrete time neural graph at times $\ell \in \{0, 1, \ldots, L\}$, the states of the nodes may be given by $Z_v(\ell+1) = f_{\theta_v}(\Sigma_{(u,v) \in E} w_{uv} Z_u \ell), \ell)$, and the output of the neural graph by $\hat{y} = h_\psi(Z_{V_E}(L))$. The states of the nodes also may be expressed by $Z_V(\ell+1) = f_\theta(\mathcal{A}_G Z_V(\ell), \ell)$, where $Z_V(\ell) = (Z_V(\ell))_{v \in V}$, $f_\theta(z, \ell) = (f_{\theta_v}(z_v, \ell))_{v \in V}$ and $\mathcal{A}_G$ is the weighted adjacency matrix for neural graph G. In this example, information is sent through the edges at each time step using $\mathcal{A}_G$ and then a function is applied at each node. For continuous time neural graph, the time t may take on a continuous range of values. In this example, the dynamics may be expressed by $\nabla Z_V(t) = f_\theta(\mathcal{A}_G Z_V(t), t)$. The Training and Wiring Discovery Algorithm described above may be used to discover neural wirings in dynamic neural graphs by swapping in these equations in place of those used for the static neural graph example.

According to aspects of the subject technology, nodes in the neural graphs may be perform a strided two-dimensional convolution on input data to generate output data having a different size. In dynamic neural graphs where any node can be connected to any other node according to the processes described above, the size differences between the output data from a node performing a strided convolution and the input dimensions of another node may present issues. According to aspects of the subject technology, the output data from a node performing a strided convolution may be padded with zeros to maintain the size of the data for passing along to the next node.

Figure 7:
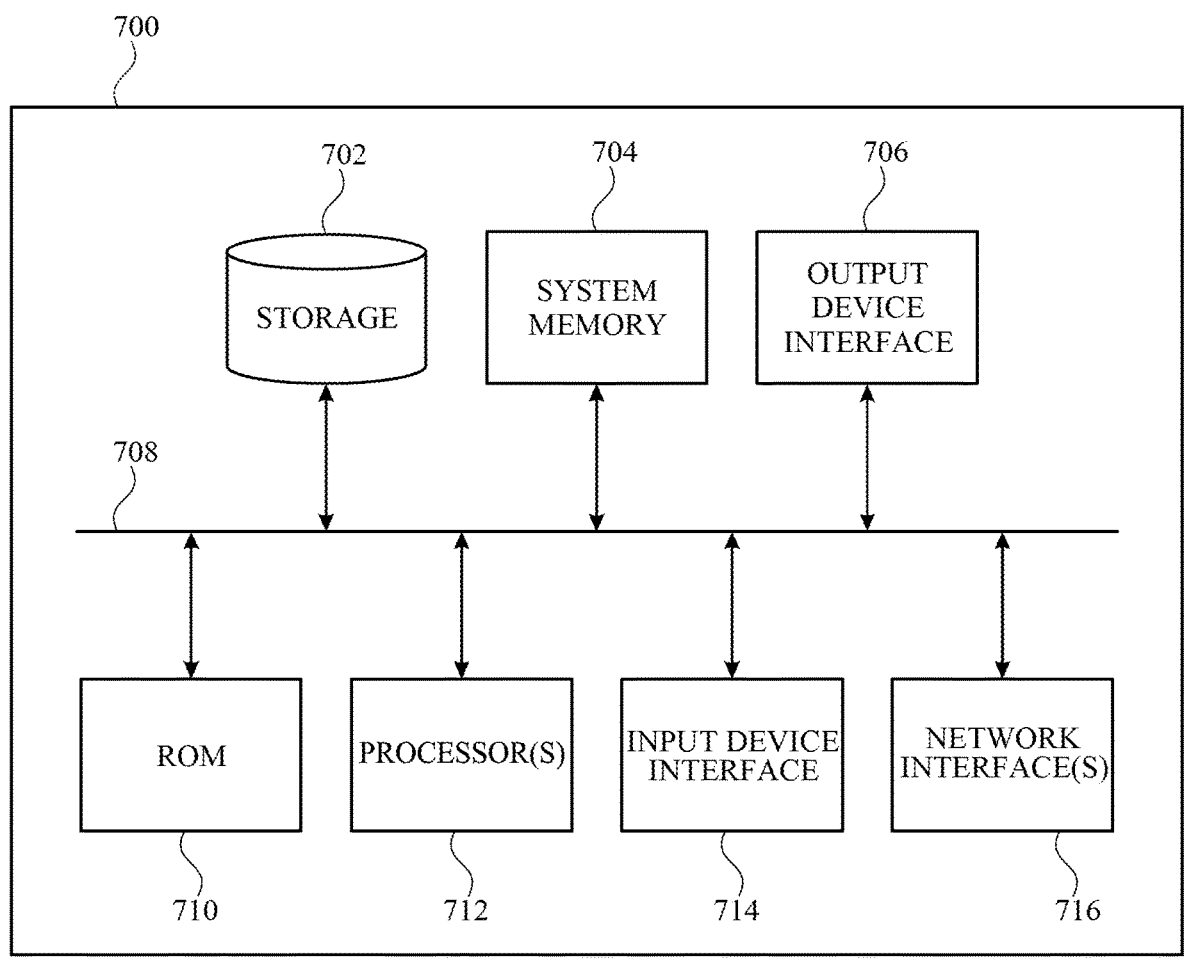
FIG. 7 illustrates an example of a computer system with which aspects of the subject technology may be implemented.

FIG. 7 illustrates an electronic system 700 with which one or more implementations of the subject technology may be implemented. The electronic system 700 can be, and/or can be a part of, server 110 and/or computing device 120 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the computing device 120 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized as computer program products comprising code in a tangible computer-readable storage medium (or multiple tangible computer-readable storage media of one or more types) encoding one or more instructions of the code. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or segmented in a different way) all without departing from the scope of the subject technology.

Aspects of the present technology may include the gathering and use of data available from specific and legitimate sources to train neural networks and to apply to trained neural networks deployed in systems. The present disclosure contemplates that in some instances, this gathered data may include personal information data that uniquely identifies or can be used to identify a specific person. Such personal information data can include meta-data or other data associated with images that may include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to train a neural network for better image classification performance. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of training data collection, the present technology can be configured to allow users to select to "opt in" or "opt out" of participation in the collection of personal information data during registration for services or anytime thereafter. In another example, users can select not to provide mood-associated data for use as training data. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, training data can be selected based on aggregated non-personal information data or a bare minimum amount of personal information, such as the content being handled only on the user's device or other non-personal information available to as training data.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    assigning a respective weight to each edge of a plurality of edges connecting nodes of a neural graph, wherein the neural graph represents a neural network;
    designating a subset of edges from the plurality of edges based on the respective weights;
    passing data through the neural graph in a forward training pass using the designated subset of edges;
    determining a loss function based on results of the forward training pass;
    updating parameters of the neural network and the respective weights assigned to each edge of the plurality of edges in a backwards training pass based on the loss function;
    performing the steps of designating the subset of edges, passing data through the neural graph, determining the loss function, and updating parameters of the neural network and the respective weights for a plurality of iterations to train the neural network; and
    storing the trained neural network for deployment on a computing device.

2. The method of claim 1, wherein designating the subset of edges comprises:
    determining an absolute value of each of the respective weights;
    sorting the plurality of edges based on the absolute values of the respective weights; and
    designating a predetermined number of the edges in the plurality of edges having absolute respective weight values greater than the absolute respective weight values of the remaining edges of the plurality of edges as the subset of edges.

3. The method of claim 2, wherein a subset of edges designated during a first iteration is different than a subset of edges designated during a second iteration.

4. The method of claim 1, wherein updating parameters of the neural network and the respective weights of the plurality of edges comprises:
    determining a gradient with respect to the plurality of edges for minimizing the loss function;
    passing the gradient through the designated subset of edges in the backwards training pass; and
    passing the gradient to but not through remaining edges of the plurality of edges in the backwards training pass.

5. The method of claim 1, wherein the plurality of edges comprises edges connecting each node in the neural graph to every other node in the neural graph.

6. The method of claim 1, wherein the neural network is a convolutional neural network with each node configured to perform a convolution on input data to generate output data, the method further comprising:
    passing input data having a first size through each node to generate output data having a second size smaller than the first size; and
    padding the generated output data for the generated output data to have the first size.

7. The method of claim 1, wherein the neural graph is a static graph having no looping paths.

8. The method of claim 1, wherein the neural graph is a dynamic graph comprising at least one looping path.

9. A system, comprising:
    a processor; and
    a memory device containing instructions which, when executed by the processor, cause the processor to:
        assign a respective weight to each edge of a plurality of edges connecting nodes of a neural graph, wherein the neural graph represents a neural network and the plurality of edges comprises edges connecting each node in the neural graph to every other node in the neural graph;
        designate a subset of edges from the plurality of edges based on the respective weights;
        pass data through the neural graph in a forward training pass using the designated subset of edges;
        determine a loss function based on the results of the forward training pass;
        update parameters of the neural network and the respective weights assigned to each edge of the plurality of edges in a backwards training pass based on the loss function;
        perform the steps of designating the subset of edges, passing data through the neural graph, determining the loss function, and updating parameters of the neural network and the respective weights for a plurality of iterations to train the neural network; and
        store the trained neural network for deployment on a computing device.

10. The system of claim 9, wherein to designate the subset of edges the instructions, when executed by the processor, cause the processor to:
    determine an absolute value of each of the respective weights;
    sort the plurality of edges based on the absolute values of the respective weights; and
    designate a predetermined number of the edges in the plurality of edges having absolute respective weight values greater than the absolute respective weight values of the remaining edges of the plurality of edges as the subset of edges.

11. The system of claim 10, wherein a subset of edges designated during a first iteration is different than a subset of edges designated during a second iteration.

12. The system of claim 9, wherein to update parameters of the neural network and the respective weights of the plurality of edges the instructions, when executed by the processor, cause the processor to:

determine a gradient with respect to the plurality of edges for minimizing the loss function;

pass the gradient through the designated subset of edges in the backwards training pass; and pass the gradient to but not through remaining edges of the plurality of edges in the backwards training pass.

13. The system of claim 9, wherein the neural network is a convolutional neural network with each node configured to perform a convolution on input data to generate output data, and wherein the instructions, when executed by the processor, cause the processor to:

pass input data having a first size through each node to generate output data having a second size smaller than the first size; and pad the generated output data for the generated output data to have the first size.

14. A computer program product comprising code stored in a non-transitory computer-readable storage medium, the code comprising:

code for assigning a respective weight sampled from a distribution of weights to each edge of a plurality of edges connecting nodes of a neural graph, wherein the neural graph represents a neural network;

code for designating a subset of edges from the plurality of edges based on the respective weights;

code for passing data through the neural graph in a forward training pass using the designated subset of edges;

code for determining a loss function based on results of the forward training pass;

code for updating parameters of the neural network and the respective weights assigned to each edge of the plurality of edges in a backwards training pass based on the loss function;

code for performing the steps of designating the subset of edges, passing data through the neural graph, determining the loss function, and updating parameters of the neural network and the respective weights for a plurality of iterations to train the neural network; and code for storing the trained neural network for deployment on a computing device.

15. The computer program product of claim 14, wherein the code for designating the subset of edges comprises:

code for determining an absolute value of each of the respective weights;

code for sorting the plurality of edges based on the absolute values of the respective weights; and code for designating a predetermined number of the edges in the plurality of edges having absolute respective weight values greater than the absolute respective weight values of the remaining edges of the plurality of edges as the subset of edges.

16. The computer program product of claim 15, wherein a subset of edges designated during a first iteration is different than a subset of edges designated during a second iteration.

17. The computer program product of claim 14, wherein the code for updating parameters of the neural network and the respective weights of the plurality of edges comprises:

code for determining a gradient with respect to the plurality of edges for minimizing the loss function;

code for passing the gradient through the designated subset of edges in the backwards training pass; and code for passing the gradient to but not through remaining edges of the plurality of edges in the backwards training pass.

18. The computer program product of claim 14, wherein the plurality of edges comprises edges connecting each node in the neural graph to every other node in the neural graph.

19. The computer program product of claim 14, wherein the neural network is a convolutional neural network with a plurality of nodes configured to perform a convolution on input data to generate output data, and wherein the code further comprises:

code for passing input data having a first size through each of the plurality of nodes to generate output data having a second size smaller than the first size; and code for padding the generated output data for the generated output data to have the first size.

20. The computer program product of claim 19, wherein the generated output data is padded with zeros.

* * * * *